(12) United States Patent
Hollingsworth et al.

(10) Patent No.: US 10,596,934 B2
(45) Date of Patent: Mar. 24, 2020

(54) CONFIGURABLE TRANSIT SEATING SYSTEMS AND METHODS

(71) Applicant: Cal Poly Corporation, San Luis Obispo, CA (US)

(72) Inventors: Ritchie Dave Hollingsworth, Paso Robles, CA (US); Joseph D Mello, San Luis Obispo, CA (US); Luke Daniel Mielke, San Jose, CA (US); Christopher Luis San Nicolas, Long Beach, CA (US); Jonathan William Rich, Rohnert Park, CA (US); Samuel Robert Thompson, Sunnyvale, CA (US)

(*) Notice: Subject to any disclaimer, the term of this patent is extended or adjusted under 35 U.S.C. 154(b) by 7 days.

(21) Appl. No.: 15/921,670

(22) Filed: Mar. 15, 2018

(65) Prior Publication Data

US 2019/0283632 A1    Sep. 19, 2019

(51) Int. Cl.
| | | |
|---|---|---|
| *B60N 2/30* | (2006.01) | |
| *B60N 2/02* | (2006.01) | |
| *B60N 2/24* | (2006.01) | |
| *B60N 2/12* | (2006.01) | |
| *B60N 2/22* | (2006.01) | |
| *B60N 2/01* | (2006.01) | |

(52) U.S. Cl.
CPC ............ *B60N 2/3047* (2013.01); *B60N 2/01* (2013.01); *B60N 2/0292* (2013.01); *B60N 2/12* (2013.01); *B60N 2/2227* (2013.01); *B60N 2/242* (2013.01); *B60N 2/3027* (2013.01); *B60N 2002/2204* (2013.01)

(58) Field of Classification Search
CPC ...... B60N 2/3047; B60N 2/01; B60N 2/0292; B60N 2/12; B60N 2/02; B60N 2/2227; B60N 2/242; B60N 2/3027; B60N 2002/2204
USPC .......................................................... 297/19
See application file for complete search history.

(56) References Cited

U.S. PATENT DOCUMENTS

| | | | | |
|---|---|---|---|---|
| 5,364,151 A * | 11/1994 | Yurasits | .................... | A47C 9/06 180/326 |
| 5,951,104 A * | 9/1999 | Tsuchiya | .............. | B60N 2/0292 296/65.09 |
| 6,629,721 B1 * | 10/2003 | Macey | ..................... | B60N 2/01 296/65.13 |
| 7,510,227 B2 * | 3/2009 | Mahaffy | ............ | B60N 2/01508 296/64 |

(Continued)

FOREIGN PATENT DOCUMENTS

| | | | |
|---|---|---|---|
| DE | 102005002916 | * | 8/2006 |
| GB | 2523817 | * | 9/2015 |

*Primary Examiner* — Mark R Wendell

(57) ABSTRACT

A system, method and apparatus for a transit seating system including multiple seat frames, each seat frame including, at least one forward support and at least one rearward support. The at least one forward support and the at least one rearward support are capable of being detachably secured to a transit vehicle floor. A seat back height track system is vertically and slideably coupled to the seat frame. A seat back subframe is coupled to the seat back height track system. A seat base frame is coupled to the seat back height track system through a seat hinge. The at least one forward support is capable of overlapping the at least one rearward support when at least two of the seat frames are in a nested or fully compressed or stowed configuration.

18 Claims, 13 Drawing Sheets

(56) References Cited

U.S. PATENT DOCUMENTS

| | | | | |
|---|---|---|---|---|
| 9,849,045 | B2* | 12/2017 | Bourgraf | A61G 3/0218 |
| 9,937,835 | B1* | 4/2018 | Khalid | B60N 2/01 |
| 2002/0021016 | A1* | 2/2002 | Bergquist | B60N 2/01 |
| | | | | 296/65.09 |
| 2008/0164736 | A1* | 7/2008 | Figueras Mitjans | E04H 3/123 |
| | | | | 297/257 |
| 2008/0185893 | A1* | 8/2008 | Behrens | B60N 2/3011 |
| | | | | 297/378.1 |
| 2008/0252121 | A1* | 10/2008 | Smith | B60N 2/3011 |
| | | | | 297/236 |
| 2010/0052386 | A1* | 3/2010 | Phinney | B60N 2/01 |
| | | | | 297/257 |
| 2012/0306252 | A1* | 12/2012 | Ligonniere | B64D 11/06 |
| | | | | 297/354.1 |
| 2013/0038103 | A1* | 2/2013 | Scott | B64D 11/06 |
| | | | | 297/248 |
| 2014/0306060 | A1* | 10/2014 | Schomacker | B60N 2/07 |
| | | | | 244/118.6 |
| 2017/0057380 | A1* | 3/2017 | Vikstrom | B60N 2/0292 |
| 2017/0341532 | A1* | 11/2017 | Sowinski | B60N 2/0732 |
| 2018/0105078 | A1* | 4/2018 | Murray | B60N 2/2227 |

* cited by examiner

CONFIGURABLE TRANSIT SEATING SYSTEMS AND METHODS

FIELD OF THE DISCLOSURE

The present disclosure relates generally to human seating systems, and more particularly, to methods and systems for adjustable human seating systems in a transit system.

BACKGROUND

Human transit systems strive to meet the varying demands of the passengers they must accommodate. Passengers can be shorter, average or taller in stature. Passengers can be wider, average or narrower in girth. Passengers can desire to stand or sit or recline. Passengers may wish to travel with cargo, luggage, etc. Transit systems operators often desire to make seating more compact to carry more passengers in the same volume of their transport vehicle.

Unfortunately, the typical passenger seating systems and methods cannot effectively meet these varying demands of the passengers and the transit system operators. It is in this context that the following embodiments arise.

SUMMARY

Broadly speaking, the present disclosure fills these needs by providing a configurable transit seating system, methods and apparatus. It should be appreciated that the present disclosure can be implemented in numerous ways, including as a process, an apparatus, a system, or a device. Several inventive embodiments of the present disclosure are described below.

One embodiment provides a transit seating system including multiple seat frames. The seat frame including forward supports and rearward supports. The forward supports and the rearward supports are capable of being detachably secured to a transit vehicle floor. A seat back height track system is vertically and slideably coupled to the seat frame. A seat back subframe and a seat base frame are coupled to the seat back height track system. The forward supports are capable of overlapping the rearward supports when at least two of the seat frames are in a nested configuration. The seat back height track system provides a height adjustment for the seat back subframe and the seat base frame.

Another embodiment provides a method for adjusting transit seats including pivoting the seat base of a first seat down toward the floor and reducing the pitch between the first seat and a second seat. The pitch between the first seat and a second seat can be minimized and forward supports of the first seat can overlap the rearward supports of the second seat when the pitch is minimized.

Another embodiment provides a transit seating system including two seats, one in front of the other. The seats are detachably coupled to a track system in the floor of the transit vehicle. The seat backs and seat bases can move upward and downward along a seat back height track system mounted on the frame of the seats. The seat base can also pivot though a seat hinge. The seat base of the first seat can be pivoted downward to an angle between perpendicular and parallel to a floor plane of the transit vehicle to increase a space between the first seat and the second seat. The seat pitch can be adjusted to larger or smaller. In a minimized seat pitch, the forward supports of the one seat overlap the rearward supports of the seat in front.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Figure 1:
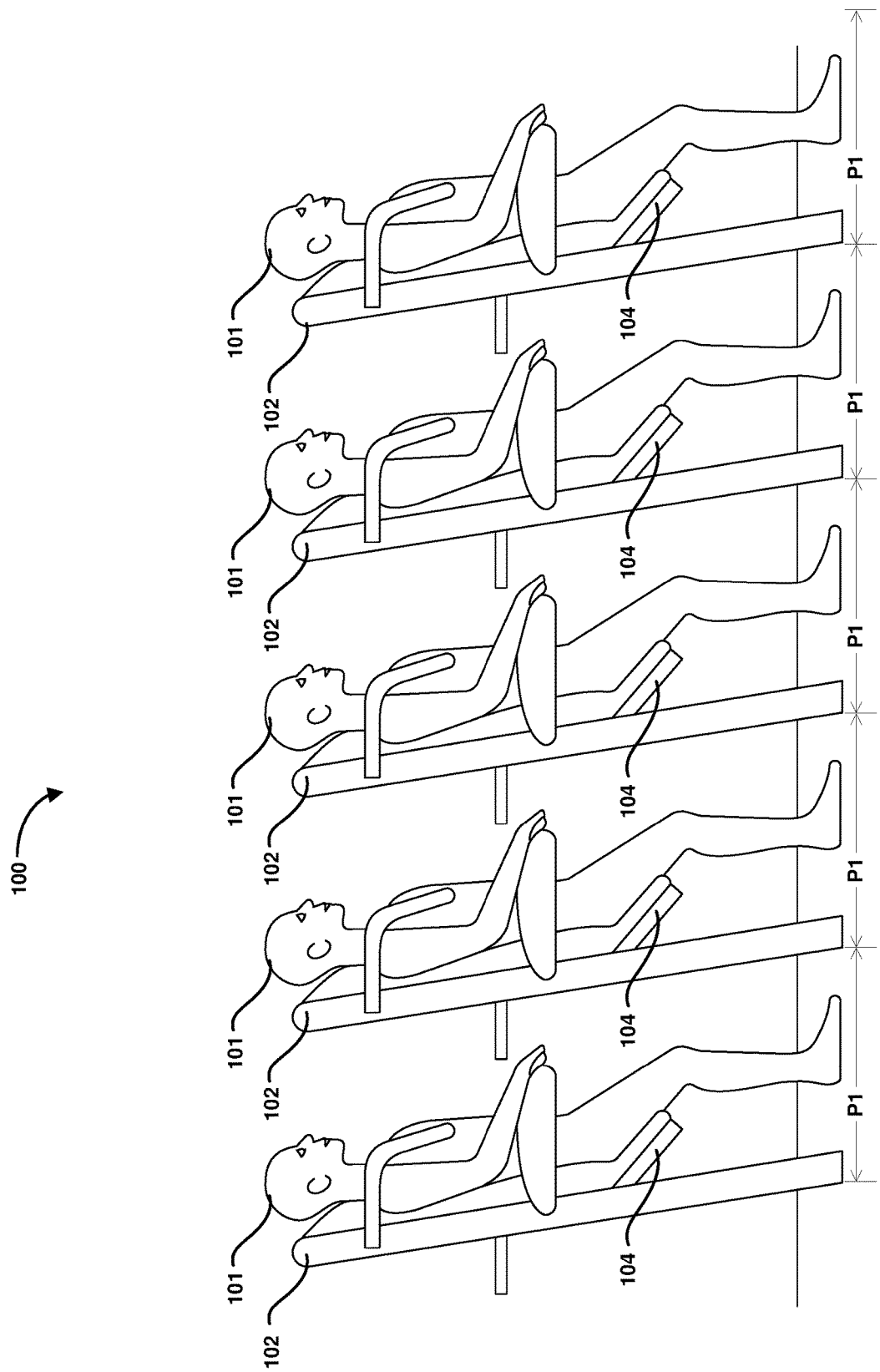
FIG. 1 is a high-density passenger support system.

Several exemplary embodiments for a configurable transit seating system, methods and apparatus will now be described. It will be apparent to those skilled in the art that the present disclosure may be practiced without some or all of the specific details set forth herein.

Transit seating systems described herein can be used in many different types of transportation systems, including aircraft, water based vehicles such as a boat, a water taxi or water bus, rail-based vehicles such as trains, trams, subways and road vehicles such as buses and any other sort of transit vehicle for transporting people. The ability to easily and quickly reconfigure the seating systems provides an advantage of adjusting to the current demands of the passengers and cargo being transported.

One implementation of the disclosed embodiments includes integrated seats which are fixedly attached to feet fitted to a rail system in the transit vehicle floor, allowing for longitudinal adjustment of the transverse orientated seats. The seats could also be fitted longitudinally, however it is anticipated transverse mounting with the passenger facing toward (e.g., forward) or away from (e.g. rearward) the direction of travel would be most beneficial. One implementation includes a seat frame that is a rigid member with feet fitted for attachment to the vehicle via a track/rail system. One or more of the feet are equipped with an easily operated latching system securing the seat base to the track/rail.

Seat assemblies may be configured with one, two, three or more seat positions. Seat frame design and number of track/rails can be determined by the number of seating positions and design loads. The track system allows adjustment of seat pitch spacing and nesting of the seats. However, the track system is not necessarily required and other seat to vehicle interconnection systems can be used.

In one implementation, the seats can be arranged in a fixed pitch (e.g., seat spacing) with open space gained between rows of seats when the seats are in a medium or fully compressed pitch configuration. Adjusting the seat pitch releases space for bicycles, luggage or additional standees in the open areas of the vehicle.

Each individual seat is adjustable by the passenger between a standard seating configuration, a semi seated configuration (e.g., medium compressed configuration) or a leaning cushion configuration (e.g., seat base in full down position) and a full vertical configuration (e.g., fully compressed configuration). The standard seating configuration, with a typical pitch, would be used for typical passenger loads.

In one implementation, the seat base height can be adjusted by the passenger to accommodate different sized passengers. The semi seated configuration allows for tighter seat pitches where a passenger may find it to be more comfortable in a semi-seated position rather than standing. The vertical configuration allows rows of seats to be nested with close to zero pitch. The vertical configuration with sufficient pitch between the rows, it is possible for a cyclist to access a sidewall mounted vertical bicycle rack or stowed between the seat rows. The cyclist could stow their bicycle and remain with the bicycle or take another seat.

In one implementation the disclosed configurable seating concept is major departure, fulfilling the requirements of passenger rail operations with flexible and configurable seating. Configurable seating is also a noteworthy departure and improvement to all seating systems currently in use on passenger rail vehicles.

In one implementation, the disclosed configurable seating utilizes a near vertical seat frame with an adjustable seat base and a fixed seat back cushion. Additional attributes such as tray table, magazine holders, additional cushions on the non-seating side and fittings for securing bicycle or mobility devices are all possible implementations based on specific requirements of a transit system operator. The seat frame may be fixed to the vehicle or movable by mounting on rail/track systems such as those common to passenger aircraft. The rail/track system allow the seat pitch to be adjusted to increase or decrease the distance between the seats to provide more or less open space for standing passengers or stowage of bicycles, luggage and such, or to nest the seats in a stowed position.

In at least one implementation, the seat base can rotate and translate vertically to provide different and unique seating positions, primary position being conventional seating. In the conventional position the passenger is seated in what can be termed a normal position, while the transit system operator has the ability to vary the seat pitch. From the conventional seating position, the seat base may be adjusted to a semi-seated position which enables the operator to decrease the seat pitch, compressing the rows of seats into less space or by maintaining the pitch provide clearance for a bicycle to enter the space to access vertical stowage at the vehicle sidewall. From the semi-seated position the seat base may be translated to the leaning cushion, in this position the passenger leans against the seat cushion, minimizing the space required for each row.

The space between the rows, front of one seat and back of the seat in front, can be used for leaning passengers, bicycle, and luggage stowage or with the pitch reduced to near zero, stowed in the nested position. When the rows of seats are nested, open floor space is maximized. As desired by the transit system operator any number of seat rows may be nested thus increasing the flexible seating configurations available. It is possible with technology known to one skilled in the art to power and thus automate some or all of the seat and row adjustments described herein. In at least one implementation, each row of seats could be automated to adjust the seat pitch of any particular row or all of the rows to the desired pitch. In at least one implementation, each seat could be automated to lock into the desired seating or leaning position.

In one implementation, a configurable seat is detachably mounted on a track secured to the floor structure of a vehicle. Attaching the seat assembly to the vehicle by rail or tracks allows for forward and rearward adjustment of the seats along the longitudinal axis of the vehicle. Each row consists of one or more seats, with two or three being a likely implementation for a typical passenger rail vehicle. Individual seating positions, one or more, are positioned on a rigid frame assembly connected to the floor rails by one or more feet which can be adjusted along and selectively secured to said rails enabling the position of each seat row assembly to be positioned along the rail. The position of each row with relationship to the adjacent row is adjustable to create the desired pitch of the seats. The seats in the standard seating position have a distance between the seat rows (pitch) that may be increased or decreased. Seating height can be adjusted by the passenger to better accommodate the range of body types. In addition to the vertical adjustment of the seat base, the angle of the seat base is also adjustable as the seat in moved to the semi-seating position.

The leaning position, with seats nested, requires the least amount of pitch or longitudinal space for each seat row. The number of seats per row, pitch, number of rows per vehicle or section of each vehicle will be determined by the transit system operator in the vehicle design phase to fit the operational requirements.

In at least one implementation, the configurable seat includes a seat rail/track system permitting adjustment of the seat pitch, distance between rows and nesting of the seats. The seat frame is used for supporting one or more seating positions is moveable attached to the seat rail/track by feet. The feet enable longitudinal movement of the seat assembly and include a latching/locking mechanism to secure the feet to the rail/track. There are many different methods for moving, positioning and securing the seat rows such as a rack and pinion, a screw and follower, or chain and sprocket and combinations thereof. A rack and pinion system could utilize a longitudinal rack with vertical oriented teeth secured to the vehicle, a pinion gear with drive mechanism could be coupled a seat or row of seats. When the pinion is rotated, the seat or row of seats moves along the rack. Using a screw and follower system, the seat or row of seats can be coupled to a longitudinal screw fitted to the vehicle. A follower is attached the seats and engages the screw, when the screw is rotated the seats moves with the follower along the length of the longitudinal screw. A mechanism attached to the follower allows the seats to be engaged and disengaged from the screw allowing the seat or row of seats to move independently of other rows of seats, thus enabling variable pitches between different rows of seats. A chain and sprocket system operates in a similar manner to the rack and pinion with the chain fixed to the vehicle and seats travel along the chain by the sprocket attached to the seat. A track system is fixedly attached to the seat frame with seat base and seat back. A hinge system with radially placed locks permit the seat base angle to be changed by releasing with a handle (not shown). In at least implementation, the handle (not shown) can also release a latch on the seat back track permitting vertical adjustment of the seat assembly. In at least one implementation, the seat track system can be powered for ease of use and allowing a remote control that can selectively configure at least one of the pitch, the seat back height, the seat base height, or the seat base angle of each of the seats or row of seats or rows of seats. In at least one implementation, the seat back height track system can be powered for ease of use and allowing a remote control that can selectively configure at least one of the seat back height, the seat base height, or the seat base angle of each of the seats or row of seats or rows of seats.

FIG. 1 is a high-density passenger support system 100. The high-density passenger support system 100 includes multiple passenger supports 102, each for supporting a passenger 101 in a minimal quantity of space. The high-density passenger support system 100 supports the passengers 101 in a semi-standing position. The seat 104 is angled downward to reduce the distance P1 between the passenger supports 102. The distance P1 between the passenger supports 102 is referred to as the pitch. As a result, the transit system operator can transport more passengers within the vehicle (e.g., train, aircraft, bus, boat, etc.) and thus sell more tickets and transport more passengers per trip. However, the high-density passenger support system 100 cannot readily adjust to accommodate passengers of varying heights, varying girths or if the passenger was transporting cargo such as shopping bags, a briefcase, luggage or even a bicycle.

Figure 2A:
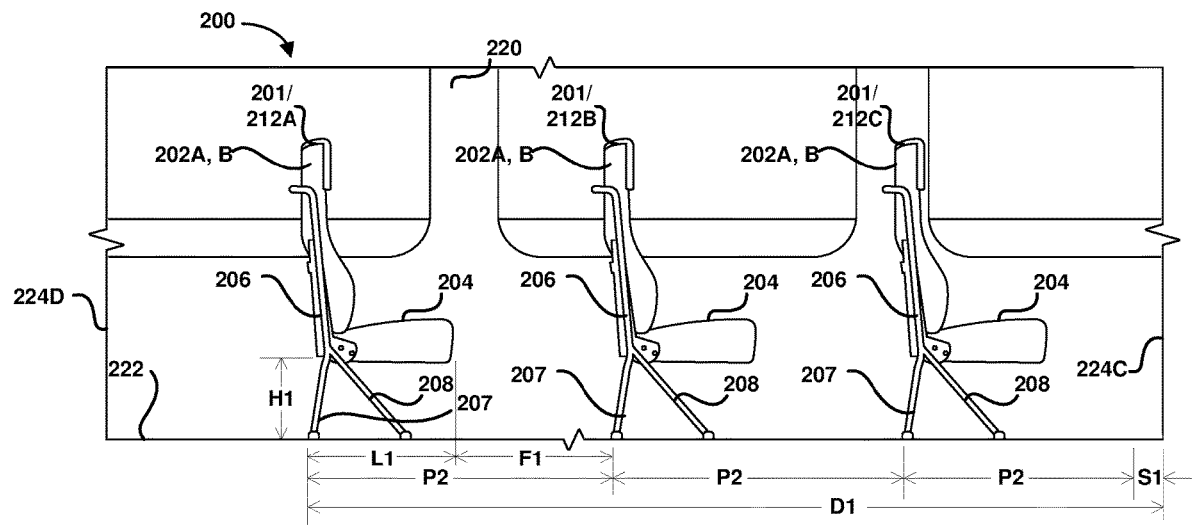
FIG. 2A is a side view of a configurable transit seating system, in a standard seating configuration, for implementing embodiments of the present disclosure.
Figure 2B:
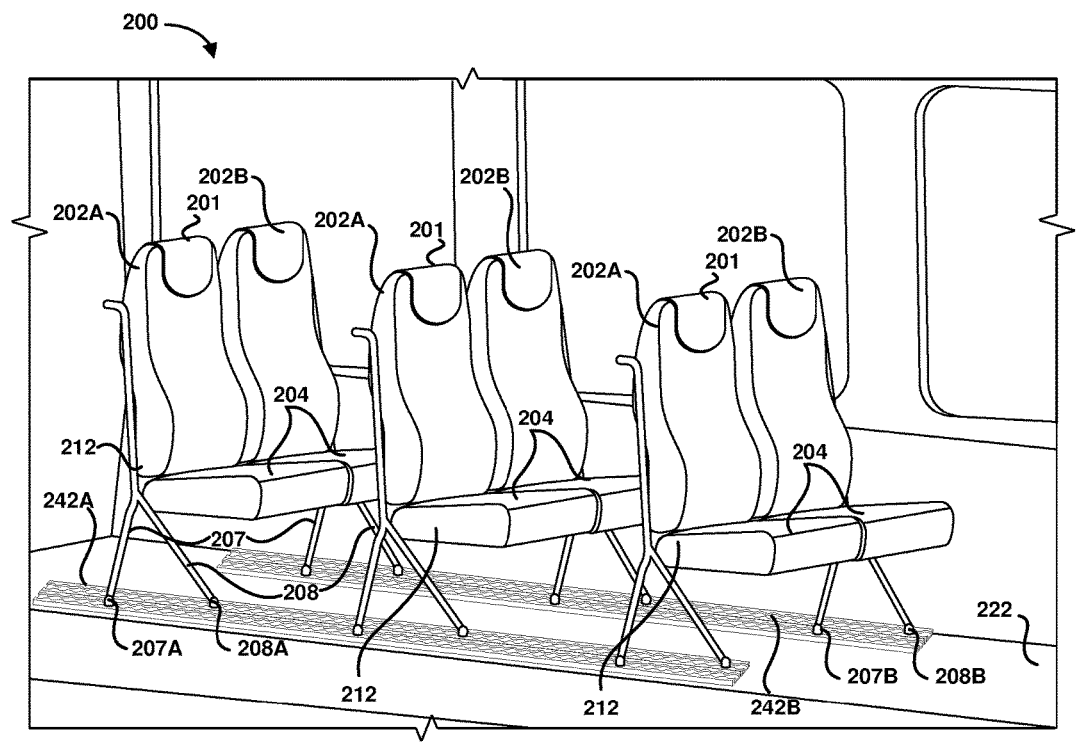
FIG. 2B is a perspective view of a configurable transit seating system, in a standard seating configuration, for implementing embodiments of the present disclosure.

FIG. 2A is a side view of a configurable transit seating system 200, in a standard seating configuration, for implementing embodiments of the present disclosure. FIG. 2B is a perspective view of a configurable transit seating system 200, in a standard seating configuration, for implementing embodiments of the present disclosure. The configurable transit seating system 200 includes one or more rows 212A-C. Each of the one or more rows 212A-C can include one or more seats 201. Each of the seats 201 including a seat back 202A, 202B, corresponding seat bases 204, a seat frame 206, at least one rearward support 207 and at least one forward support 208. In at least one implementation, the rows 212A-C of seats 201 are arranged to face the front 224C of the transport vehicle 220.

Each row of seats has a length L1 in the standard seating configuration. The multiple rows 212A-C of seats 201 consume a total row space having a combined length D1 in the standard seating configuration. The rows 212A-C of seats 201 are separated by a first pitch P2. The pitch P2 provides ample space F1 for passenger's legs, while seated in the seats 201. It should be understood that the pitch between the rows 212A-c of seats can be equal or different.

A relatively small available space S1 is not consumed by the length D1. In at least one implementation, S1 can be as small as zero and as large as desired by the transit system operator, usually by removing one or more rows 212A-C of seats 201. In at least one implementation, S1 is similar to P2 to provide space for the legs of passengers seated in the front row of seats 201. In at least one implementation, the base of the seat back 202A, 202B has a height H1 from the floor plane 222 of the vehicle 220. In at least one configuration, the seat base 204 is substantially parallel to the floor plane 222.

As shown the, configurable transit seating system 200 includes multiple rows 212A-C, with each row having two seat backs 202A, 202B, corresponding two seats bases 204 and two seat frames 206. However, it should be understood the configurable transit seating system 200 can include only one row 212A-C. Alternatively, or additionally, it should also be understood that the configurable transit seating system 200 can include only one back 202A, one corresponding seat base 204 and a single seat frame 206. The one back 202A, one corresponding seat base 204 and a single seat frame 206 can be secured to the vehicle alone or included in each row 212A-C.

The seats 201 are secured to one or more tracks 242A, 242B through the forward supports 208 and the reward supports 207. The forward supports 208 and the reward supports 207 securely engage the one or more tracks 242A, 242B through the corresponding support feet 207A, 208A. The one or more tracks 242A, 242B are secured in the floor plane 222 of the vehicle 220. The tracks 242A, 242B allow one or more rows 212A-C of seats to be removed or adjusted to change the pitch of the rows.

Figure 2C:
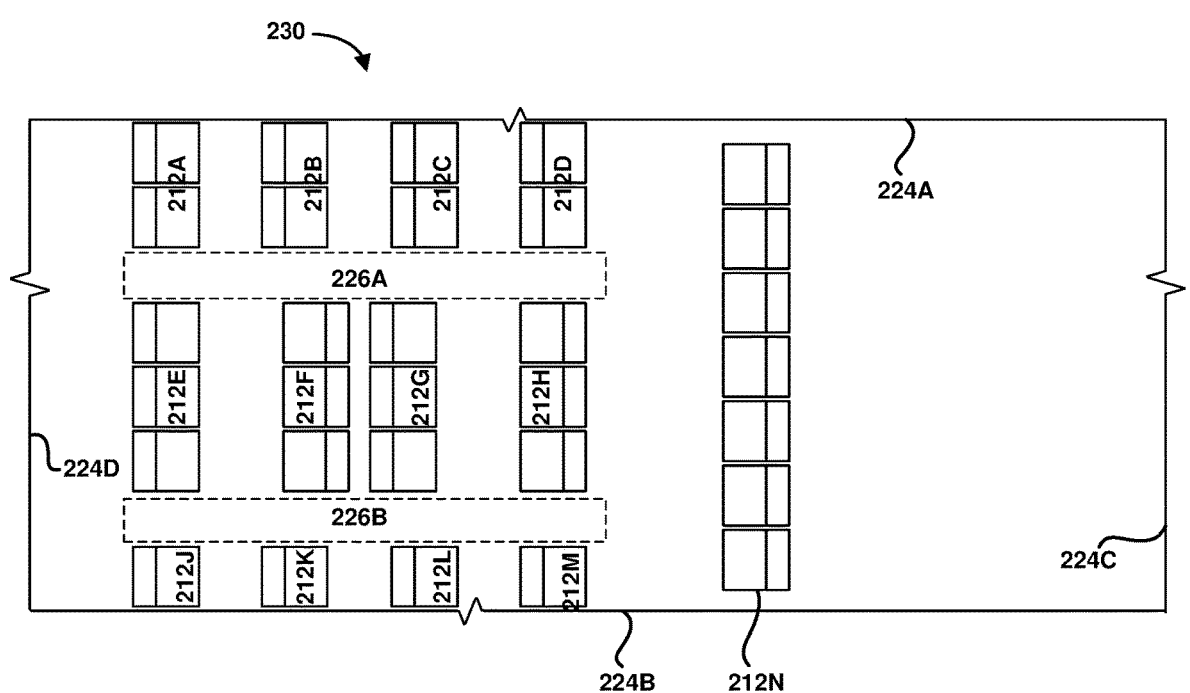
FIG. 2C is a floorplan view of a configurable transit seating system, in a standard seating configuration, for implementing embodiments of the present disclosure.

FIG. 2C is a floorplan view 230 of a configurable transit seating system 200, in a standard seating configuration 200, for implementing embodiments of the present disclosure. As shown, the configurable transit seating system 200 can include the seats 201 arranged in a column including rows 212A-D disposed adjacent to one side 224A of the vehicle 220, as shown. Each of the rows 212A-D can include one of more seats. By way of example, rows 212J-M include 1 seat per row, rows 212E-H includes three seats per row, rows 212A-D includes two seats per row 212N includes multiple seats extending from one side 224A of the transport vehicle 220 to the opposite side 224B.

Alternatively, or additionally, the configurable transit seating system 200 can include the rows 212E-H of seats disposed away from one or both sides 224A, 224B of the vehicle 220. Alternatively, or additionally, the configurable transit seating system 200 can include one or more aisles 226A, 226B disposed between the rows of seats. Alternatively, or additionally, the configurable transit seating system 200 can include the rows 212F, 212 H and 212N of seats facing rearward in the vehicle 220.

Figure 2D:
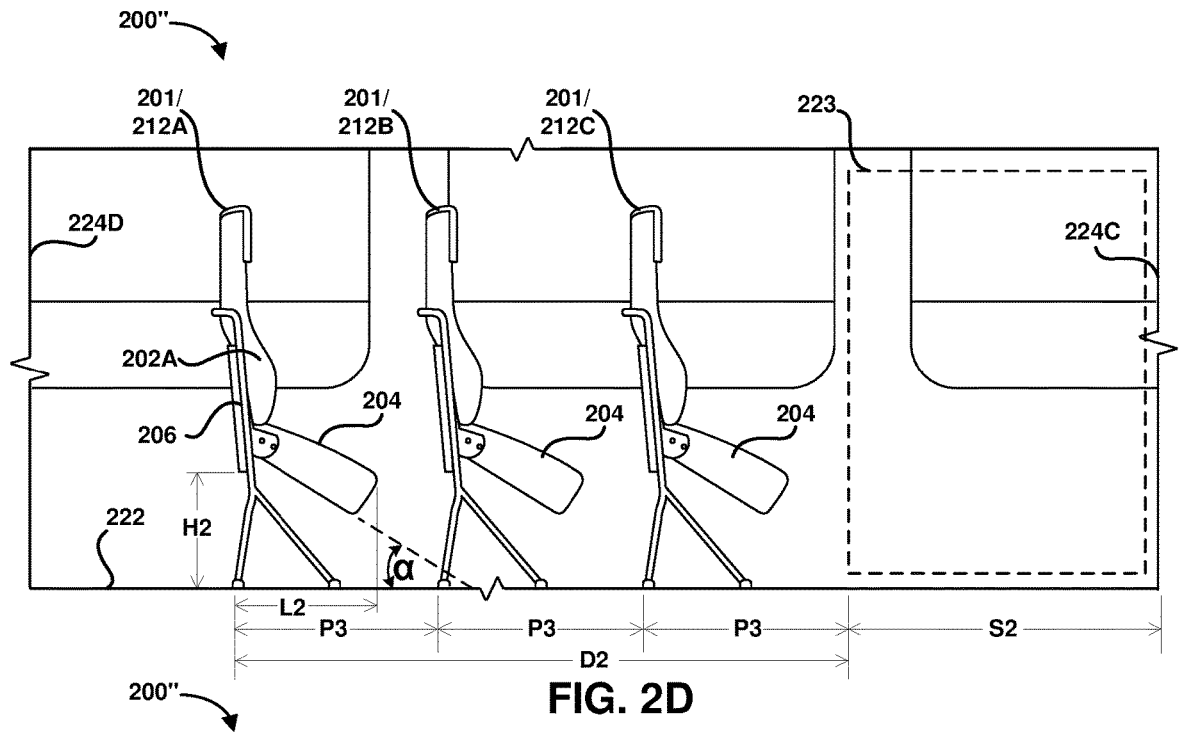
FIG. 2D is a side view of a configurable transit seating system, in a medium compressed pitch configuration, for implementing embodiments of the present disclosure.
Figure 2E:
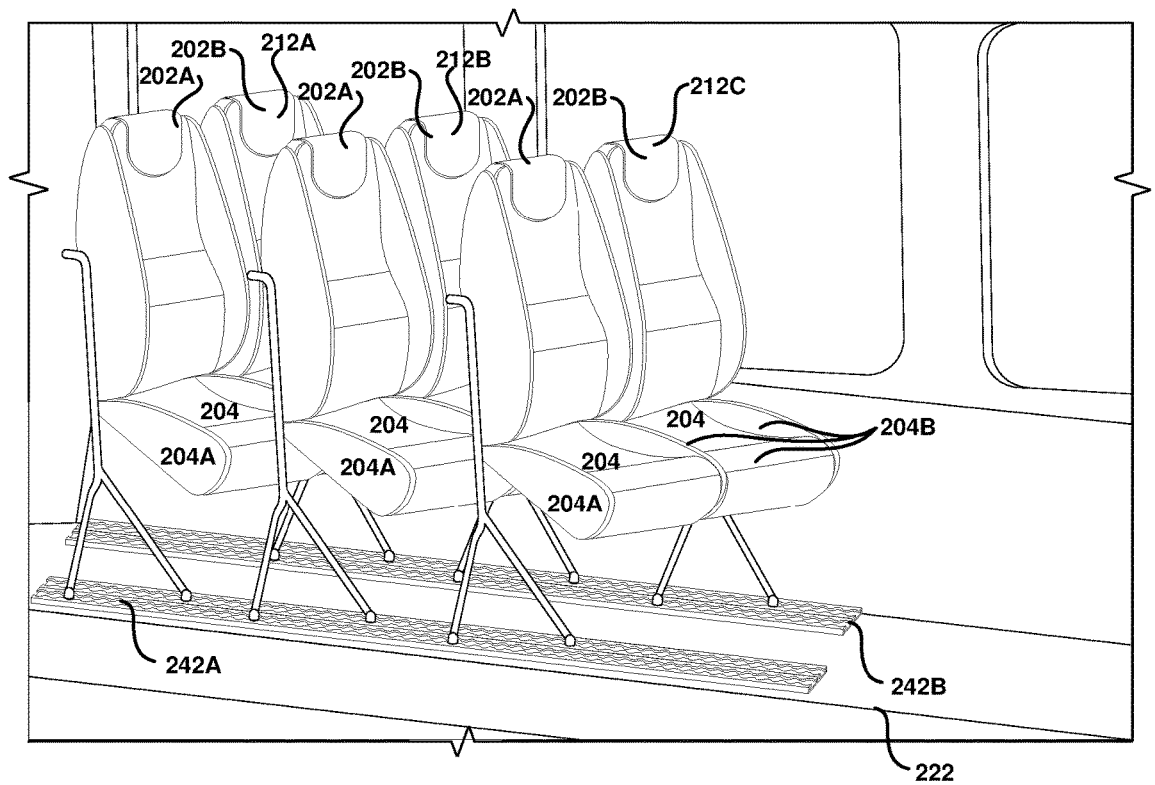
FIG. 2E is a perspective view of a configurable transit seating system, in a medium compressed pitch configuration, for implementing embodiments of the present disclosure.

FIG. 2D is a side view of a configurable transit seating system, in a medium compressed pitch configuration 200'', for implementing embodiments of the present disclosure. FIG. 2E is a perspective view of a configurable transit seating system, in a medium compressed pitch configuration 200'', for implementing embodiments of the present disclosure. The rows 212A-C of seats 201 have a length of L2 in the medium compressed pitch configuration 200'', where L2 is less than L1, shown in FIG. 2A. The rows 212A-C of seats 201 are separated by a second pitch P3 that is less than the first pitch P2, shown in FIG. 2A. In total, the rows 212A-C of seats 201 consume row space D2 in the medium compressed pitch configuration 200'', where D2 is less than D1, shown in FIG. 2A. The medium compressed pitch configuration 200'' reduces the row space D2 consumed by the rows 212A-C and allows more available space 223 having a length S2, where S2 is greater than S1, in the vehicle 220 for additional rows of seats (not shown) or cargo or other uses as may be needed based on the current demands.

In at least one implementation, the seats base 204 can be placed in a medium downward slope configuration, as shown, to reduce the horizontal distance needed for the passengers' upper legs, thus allowing the pitch P3 to be less than the pitch P2. In at least one implementation, the base of the seat back 202A, 202B and seat base 204 is raised to a height H2 from the floor plane 222 of the vehicle 220. The increased height H2 provides more distance for the passenger's legs to extend without the passenger's knees interfering with the back of the row 212A-C in front of the passenger. The seat base 204 can include a seat cushion 204A. The seat cushion 204A can optionally include one or more bolsters 204B to add comfort and to assist a passenger in staying seated on the seat cushion.

In at least one configuration, the seat base 204 forms a seat base angle α between parallel and perpendicular to the floor plane 222. In one implementation, the seat base angle α is between about 75 and about 45 degrees relative to the floor plane 222. The seat base angle α provides more distance for the passenger's legs to extend without the passenger's knees interfering with the back of the row 212A-C in front of the passenger.

Figure 2F:
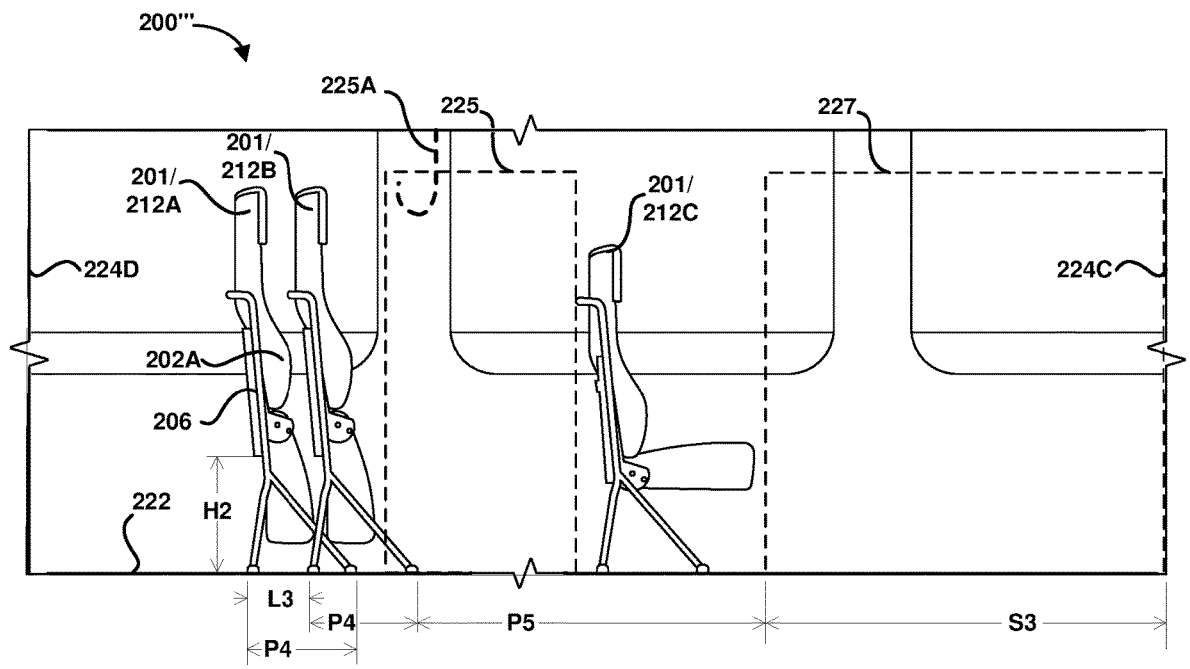
FIG. 2F is a side view of a configurable transit seating system, in a stowed configuration, for implementing embodiments of the present disclosure.

FIG. 2F is a side view of a configurable transit seating system 200, in a stowed configuration, for implementing embodiments of the present disclosure. The rows 212A-C of seats 201 have a length of L3 in the stowed configuration, where L3 is less than L2. The stowed configuration 200'''. Two rows 212A, 212B are shown in a fully compressed configuration and a first cargo space 225 is available between rows 212B and 212C. The seat base 204 is substantially perpendicular to the floor plane 222 of the transit vehicle 220, when the seat base is pivoted in the lowest position for the stowed or nested configuration.

A second cargo space 227 is formed between the front row 212C of seats and the front 224C of the vehicle. In one implementation, the space 225 can include a bicycle rack or hook 225A for stowing a bicycle between the rows of seats. The bicycle rack or hook 225A can be stowed when not in use. Alternatively, a bicycle could be stowed between the rows of seats without requiring the bicycle rack or hook 225A.

Figure 2G:
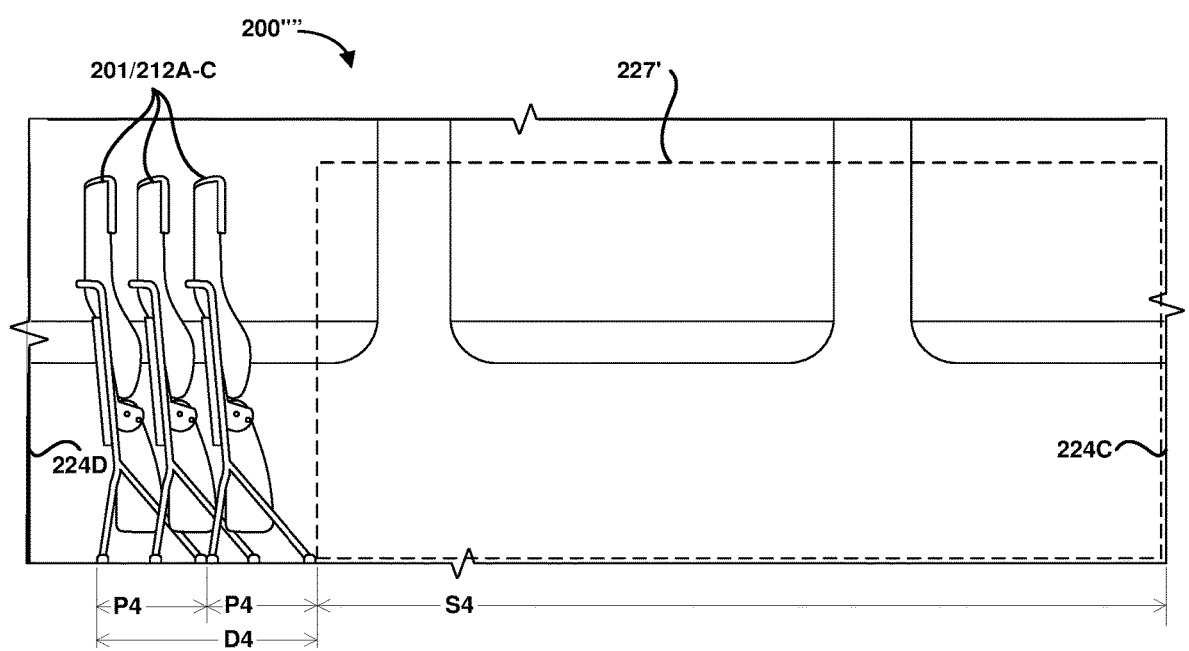
FIG. 2G is a side view of a configurable transit seating system, in a stowed configuration, fully compressed configuration, for implementing embodiments of the present disclosure.
Figure 2H:
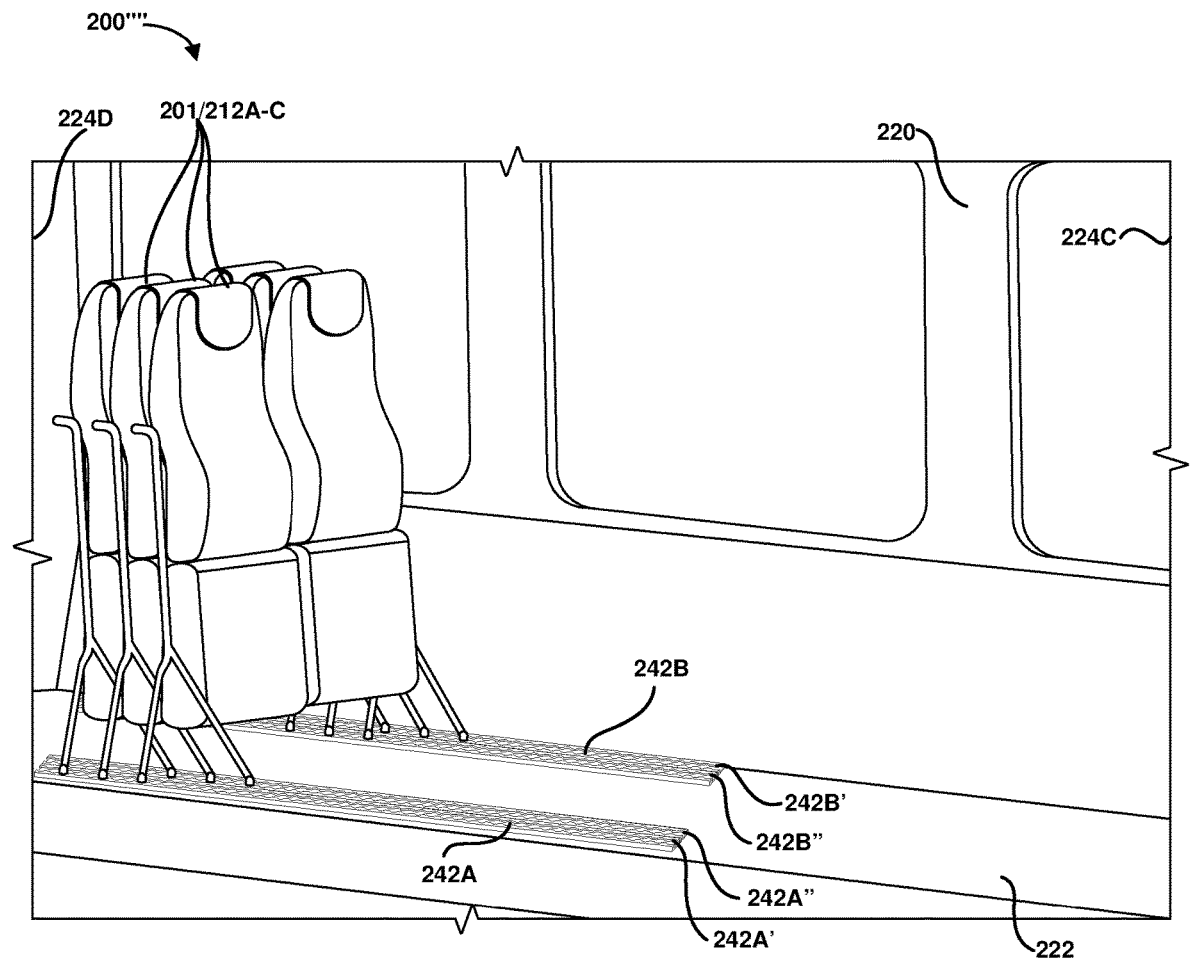
FIG. 2H is a perspective view of a configurable transit seating system, in a stowed configuration, fully compressed pitch configuration, for implementing embodiments of the present disclosure.

FIG. 2G is a side view of a configurable transit seating system 200, in a stowed configuration 200'''', fully compressed configuration, for implementing embodiments of the present disclosure. FIG. 2H is a perspective view of a configurable transit seating system 200, in a stowed configuration 200'''', fully compressed pitch configuration, for implementing embodiments of the present disclosure. The rows 212A-C of seats have a stowed configuration where the pitch P4 is minimized. In at least one configuration, the rows 212A-C of seats are nested such that the forward support 208 overlaps the rearward support 207 of the row of seats in front. A larger second cargo space 227' is formed between the front row 212C of seats and the front 224C of the vehicle.

As shown in FIG. 2H, the rows 212A-C of seats are secured to one or more tracks 242A, 242B secured in the floor plane 222 of the vehicle 220 through corresponding support feet 207A, 208A. The tracks 242A, 242B allow the rows 212A-C of seats to be adjusted to change the pitch of the rows to P4. Each of the tracks 242A, 242B include corresponding inner tracks 242A', 242B' and outer tracks 242A'', 242B''. The inner tracks 242A', 242B' and outer tracks 242A'', 242B'' are offset by a distance X1 (shown in FIG. 3A).

In at least one embodiment, the inner track 242A'' is immediately adjacent to the outer track 242A' with a minimum offset allowed by the width of the tracks. In at least one embodiment, the inner track 242B'' is immediately adjacent to the outer track 242B' with a minimum offset allowed by the width of the tracks. In at least one embodiment, the outer tracks 242A', 242B' are immediately adjacent with a minimum offset allowed by the width of the inner tracks and outer tracks 242A'', 242B''. In at least one embodiment, X1 is equal to or greater than a width of one of the inner or outer tracks.

In at least one embodiment, the rearward supports 207 for each of the rows 212A-C are coupled to the outer tracks 242A'', 242B''. In at least one embodiment, the forward supports 208 for each of the rows 212 are coupled to the inner tracks 242A', 242B'. In at least one embodiment, the forward supports 208 for each of the rows 212A-C are coupled to the outer tracks 242A'', 242B''. In at least one embodiment, the rearward supports 207 for each of the rows 212A-C are coupled to the inner tracks 242A', 242B'. The side to side offset of the inner tracks 242A', 242B' and the outer tracks 242A'', 242B'' allows the forward support 208 to overlap the rearward support 207 of the adjacent row rows 212A-C of seats, when in the stowed configuration, as shown in FIGS. 2F-H. The overlap of the forward support 208 and the rearward support 207 allows the rows 212A-C to be stowed in even less space than if the forward support and the rearward support did not overlap.

The foregoing implementations describe manually operated adjustment of the seats, it should be understood that the seats height, pitch and set base angle can be adjusted using well known powered components and one or more local and remote controls.

Figure 3A:
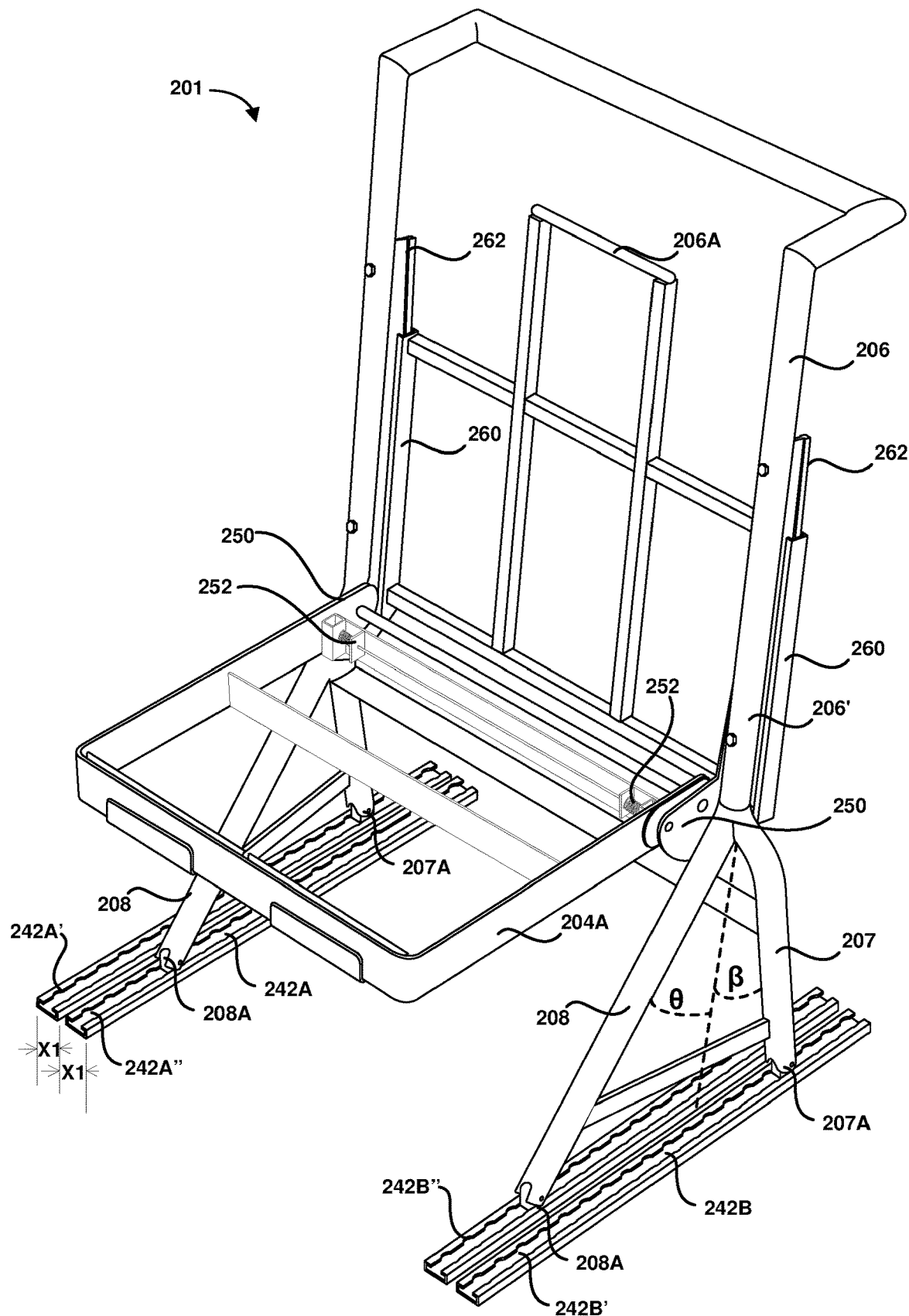
FIGS. 3A-C are perspective views of a seat frame for use in a configurable transit seating system, for implementing embodiments of the present disclosure.
Figure 3B:
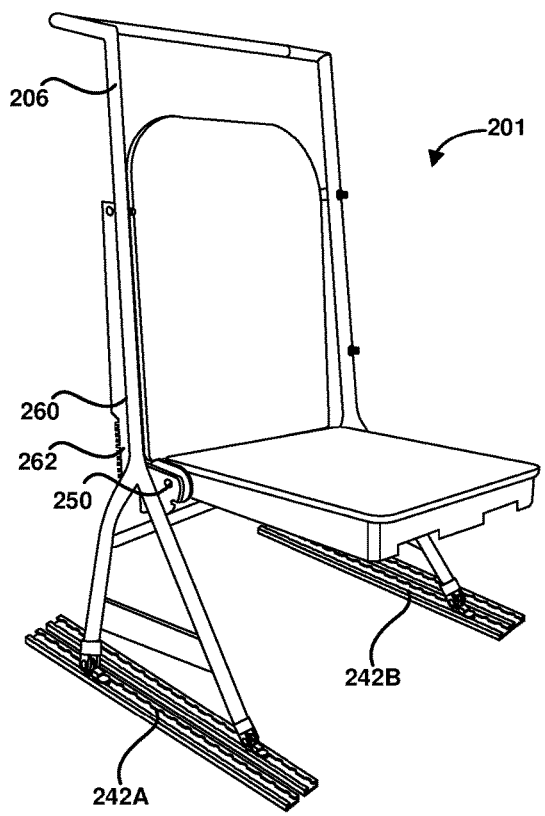
Figure 3C:
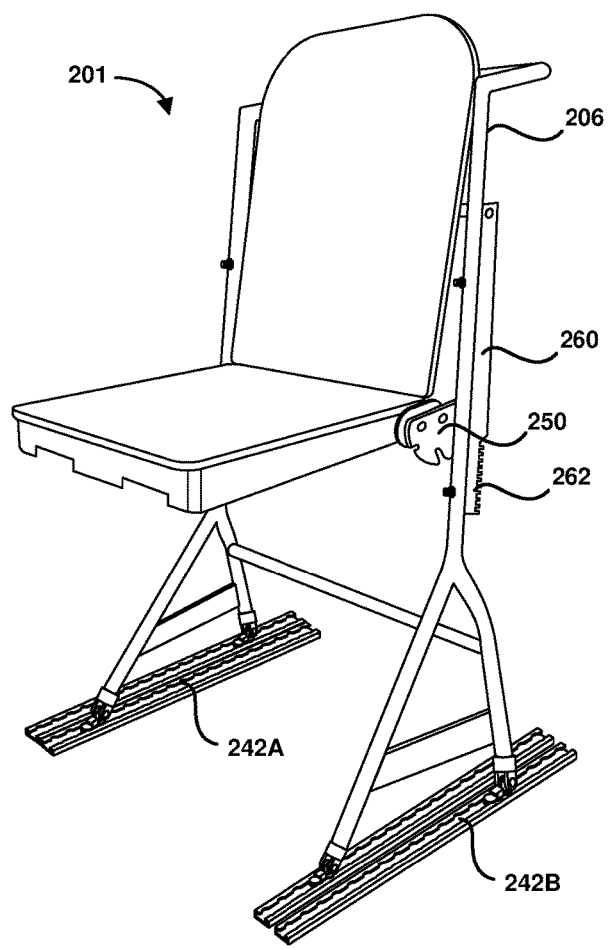

FIGS. 3A-C are perspective views of a seat 201 frame for use in a configurable transit seating system 200, for implementing embodiments of the present disclosure. The seat 201 includes a seat frame 206, seat back subframe 206A, seat base frame 204A, a hinge 250, a hinge latch system 252 and a seat back height track 260, 262 system.

In at least one implementation, the seat back subframe 206A, the seat base frame 204A, the hinge 250, and the hinge latch system 252 are mounted on the seat back height track 260, 262 system so that the seat back subframe and the seat base frame can be raised and lowered along the seat back height track. FIG. 3A shows the seat back height slider 260 and seat back height track 262 with the seat back and seat base frame 204A in the lowest position. FIGS. 3B and 3C show the seat back height slider 260 and seat back height track 262 with the seat back in the highest position.

The rearward support 207 is angled rearward away from the sides rails 206' of the seat frame at an angle β such that the rearward support can provide the required support for the projected loads. The forward support 208 is angled forward away from the sides rails 206' of the seat frame at an angle θ such that the forward support can provide the required support for the projected loads. As shown, the forward support 208 is aligned with placed in a narrower track width and secured to tracks 242A" and 242B" and the rearward support 207 is aligned with placed in a wider track width and secured to tracks 242A' and 242B' so that the forward supports can overlap to the inside of the rearward supports when in a fully nested configuration, as described above. The narrower track width is narrower than an inside width between the rearward supports 207, in this implementation. In another implementation, the forward support 208 can be aligned with and placed in a wider track width and secured to tracks 242A' and 242B' and the rearward support 207 is aligned with placed in a narrower track width and secured to tracks 242A" and 242B" so that the forward support can overlap to the outside of the rearward supports 207, when in the fully nested configuration. The narrower track width is narrower than an inside width between the forward supports 208, in this implementation.

Figure 4A:
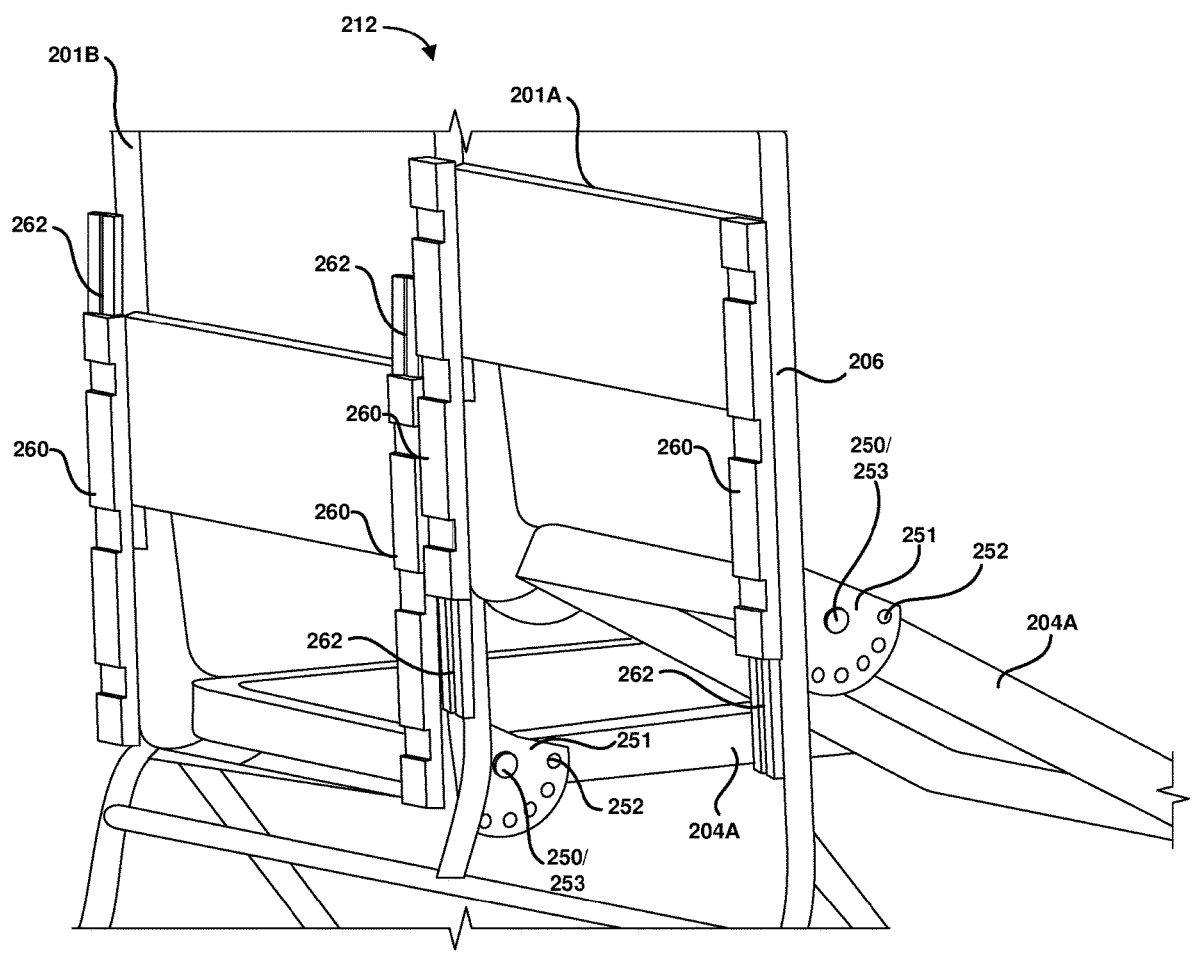
FIG. 4A is a rear perspective view of a seat row with two seats for use in a configurable transit seating system, for implementing embodiments of the present disclosure.

FIG. 4A is a rear perspective view of a seat row 212 with two seats 201A, 201B for use in a configurable transit seating system 200, for implementing embodiments of the present disclosure. The seat frame 206 includes the seat back height slider 260 and seat back height track 262 for adjusting the height of the seat back. The seat back and the seat base frame 204A are attached to the seat back height slider 260. The seat back height track 262 is attached to the seat frame 206. The seat back height slider 260 and seat back height track 262 allows the back of the seat and the seat base 204 to raise or lower relative to the seat frame. The seat 201A is shown with the seat back height slider 260 and the seat back height track 262 with the seat back in the highest position. The seat 201B is shown with the seat back height slider 260 and the seat back height track 262 with the seat back in the lowest position. One or both of the seat back height sliders 260 can include a seat back latching mechanism to selectively engage one or both of the seat back height tracks 262 at desired heights. The seat back latching mechanism can be any suitable latching mechanism such as pin or pins engaging corresponding hole or holes. In another implementation, the seat back latching mechanism can include one or more teeth that engage corresponding notches to selectively latch the seat back and seat base to a desired height. The seat back latching mechanism can be included in the seat back or seat base portion of the seat. In at least one implementation, the seat back latching mechanism is coupled to a cable and/or lever to allow ease of operation and location of a seat back height operating handle.

Figure 4B:
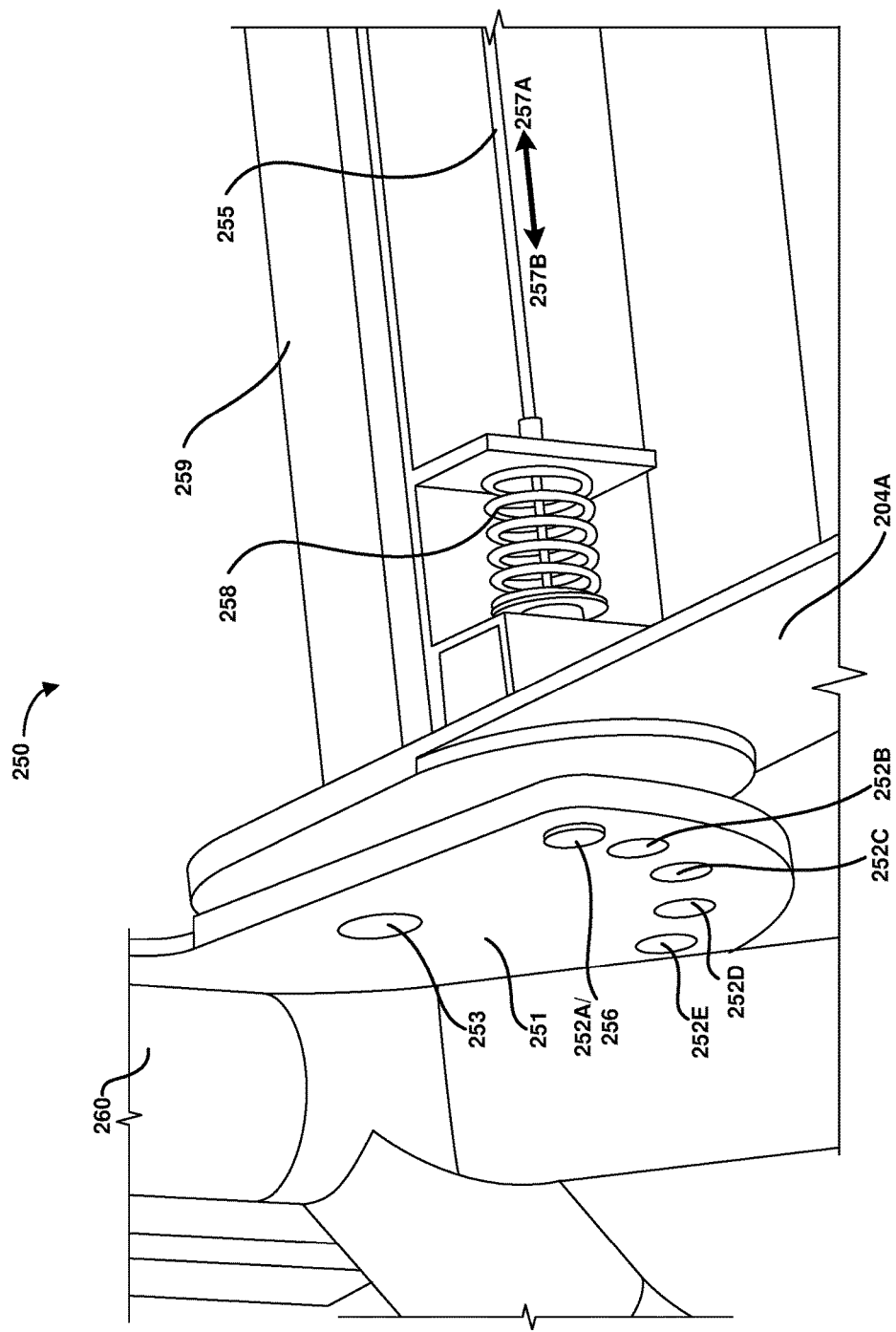
FIG. 4B is a detailed view of the hinge on each seat frame, for implementing embodiments of the present disclosure.

FIG. 4B is a detailed view of the hinge 250 on each seat frame 206, for implementing embodiments of the present disclosure. The hinge 250 includes a plate 251 secured to the seat frame 206. The plate 251 includes a pivot 253 and multiple latch points 252A-E. The pivot 252 allows the seat base frame 204A to rotate up and down about the pivot. In at least one embodiment, the pivot 252 includes a pivot shaft 259 that passes through the seat base frame 204A and into the pivot 253. A latch pin 256 selectively engages one of the latch points 252A-E to determine the angle α of the seat base 204 relative to the floor plane 222 of the vehicle, as shown in FIG. 2D, above.

The top most latch point 252A sets the seat base frame 204A in a top position. The top position can be a substantially horizontal position, as shown in FIG. 2A. Alternatively, the top position could raise the seat base frame 204A in a position higher than horizontal, such as may be desired if the seat base 204 were stowed in a raised position. The lowest latch point 252E lowers the seat to the fully lowered position as shown in FIGS. 2F-H so as to minimize the length of the seat 201 and allow the seats to be stowed in the fully compressed configuration 200"". The intermediate latch points 252B-D place the seat base frame 204A in corresponding positions between the top position and the fully lowered position.

The latch pin 256 is pressed into the latch points 252A-E by a spring 258. A cable 255 is actuated by a seat base operating handle (not shown) to pull the cable in a direction 257A to compress the spring 258 and pull the latch pin away from the latch points 252A-E. Releasing the seat base operating handle allows the cable to move in direction 257B to allow the spring 258 to extend and push the latch pin toward the latch points 252A-E to engage the selected latch point, thus selectively varying the angle of the seat base. The seat base operating handle can be located in any convenient location such as on the sides, back, bottom or part of an armrest portion of the seat. In another implementation, the angle of the seat base can be selectively varied using a Taumel style recline mechanism as described in U.S. Pat. No. 3,401,979, which is incorporated by reference herein, in its entirety. In another implementation, the seat base operating handle can be combined with the seat back height operating handle to provide a single control handle for operating the seat back height and the seat base angle.

Figure 5A:
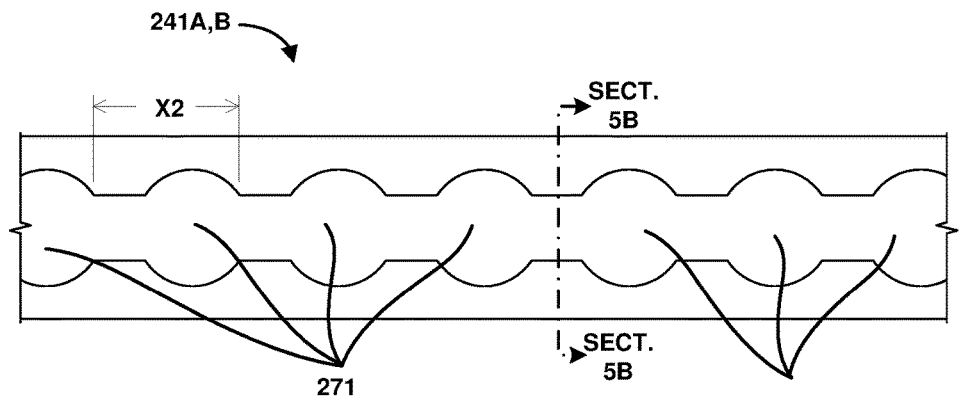
FIG. 5A is a detailed view of a segment of the track, for implementing embodiments of the present disclosure.
Figure 5B:
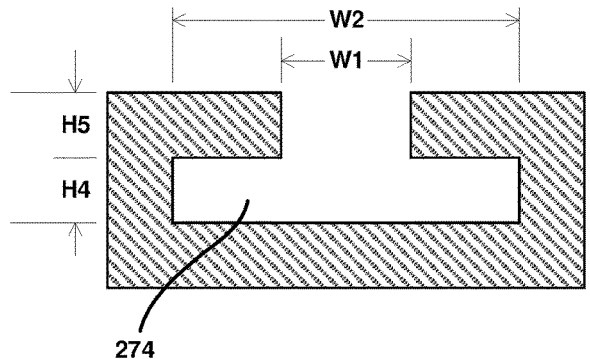
FIG. 5B is a cross-sectional view of a segment of the track, for implementing embodiments of the present disclosure.

FIG. 5A is a detailed view of a segment of the track 242A, 242B, for implementing embodiments of the present disclosure. FIG. 5B is a cross-sectional view of a segment of the track 242A, 242B, for implementing embodiments of the present disclosure. The track 242A, 242B includes an open groove 273 having a width W1 extending along the length of the track. Multiple larger diameter openings 271 are provided in the open groove 273. The multiple larger diameter openings 271 are separated by a distance X2. The multiple larger diameter openings 271 have a diameter W2. The track also includes an inner groove 274 having a width W2 and a height H4.

Figure 5C:
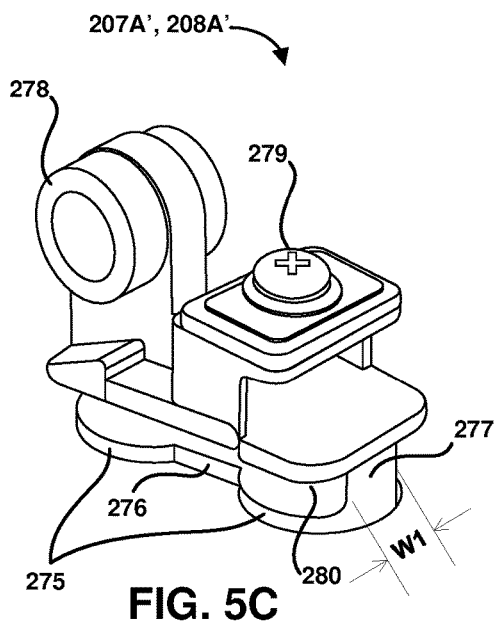
FIG. 5C is a perspective view of a support foot for use in a configurable transit seating system, for implementing embodiments of the present disclosure.
Figure 5D:
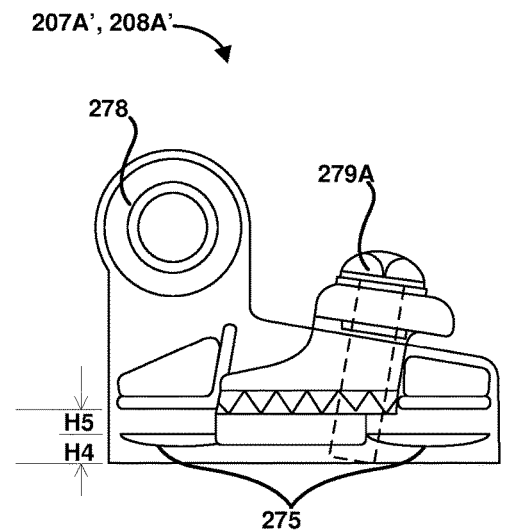
FIG. 5D is a side view of the support foot for use in a configurable transit seating system, for implementing embodiments of the present disclosure.

FIG. 5C is a perspective view of a support foot 207A, 208A for use in a configurable transit seating system 200, for implementing embodiments of the present disclosure. FIG. 5D is a side view of the support foot 207A, 208A for use in a configurable transit seating system 200, for implementing embodiments of the present disclosure. The support foot 207A, 208A includes at least one substantially round engagement pad 275. The engagement pad 275 has a diameter W2 and a thickness H4. The engagement pads 275 are separated by an engagement segment 276. The engagement segment 276 has a width W1. A horizontal groove 280 having a width H5 is formed in both sides of the engagement pads 275. The depth of the groove is sufficient that the remaining material has a thickness of less than about W1. The engagement pads 275 are separated by a distance X2.

The support foot 207A, 208A also includes a latching mechanism 27 and a mechanical interconnect 278. In this implementation, the latching mechanism includes a screw 279A.

In operation, the disengaging the latching mechanism 279, such as by loosening or removing the screw 279A, allows the engagement pads 275 to pass into the larger openings 271 of the track 242A, 242B and then slip lengthwise down the track in the inner groove 274, until located in the desired location in the track. Actuating the latching mechanism 279 locks the engagement pads 275 in positions in the track 242A, 242B between the larger openings 271.

Figure 5E:
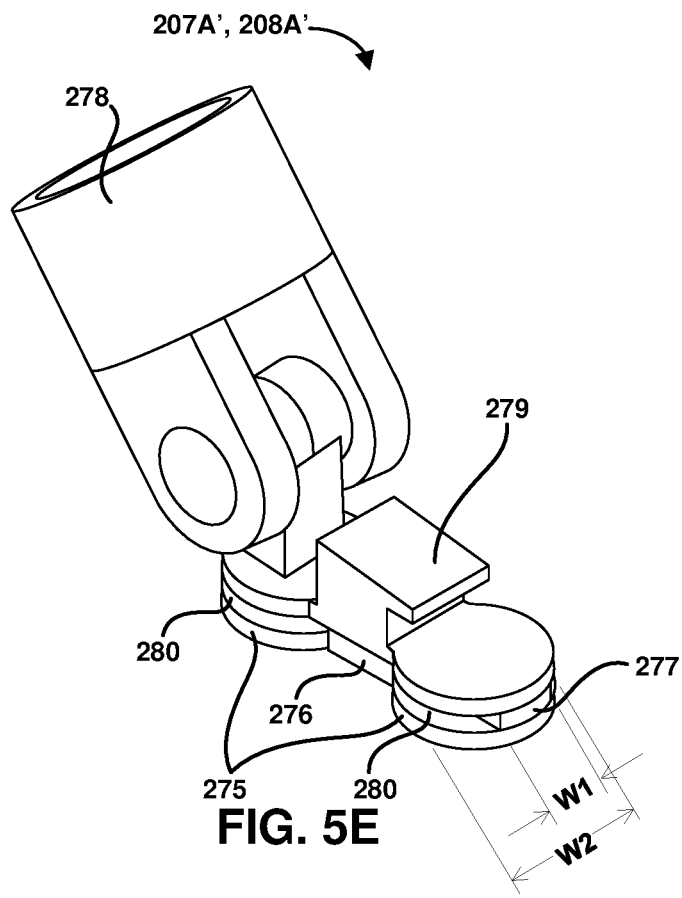
FIG. 5E is a perspective view of an alternative support foot for use in a configurable transit seating system, for implementing embodiments of the present disclosure.

FIG. 5E is a perspective view of an alternative support foot 207A', 208A' for use in a configurable transit seating system 200, for implementing embodiments of the present disclosure. The support foot 207A, 208A includes at least one substantially round engagement pad 275. The engagement pad 275 has a diameter W2. The engagement pads 275 are separated by an engagement segment 276. The engagement segment 276 has a width W1. A horizontal groove 280 having a width H5 is formed in both sides of the engagement pads 275. The depth of the groove is sufficient that the remaining material has a thickness of less than about W1. The engagement pads 275 are separated by a distance X2. The alternative support foot 207A', 208A' also includes a latching mechanism 279' and a mechanical interconnect 278'. The alternative support foot 207A', 208A' operates substantially the same as the support foot 207A, 208A, described above.

Unlatching the support feet 207A, 208A on a seat 201 or row 212, allows the seat or row to be moved along the length of the tracks 242A, 242B to the desired location of the seat or row, and then secured in the desired location by latching the latching mechanism. Similarly, seats and rows of seats can be added or removed from the tracks 242A, 242B.

Figure 5F:
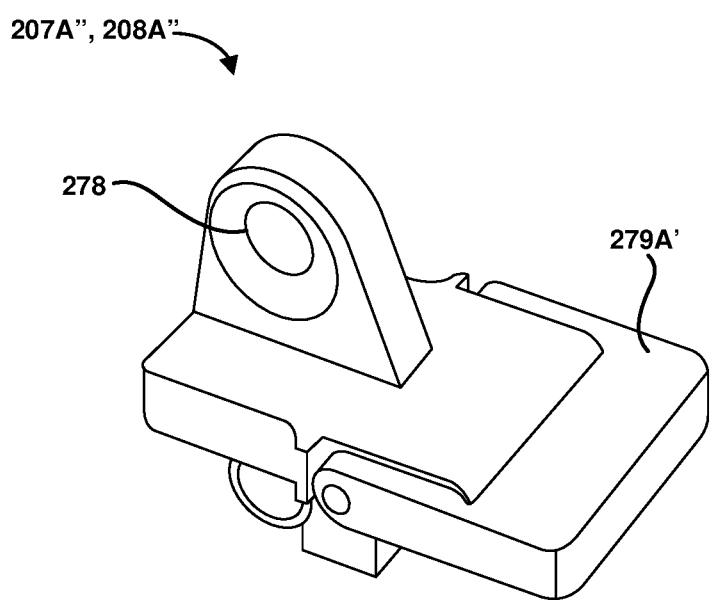
FIG. 5F is another alternative support foot for use in a configurable transit seating system, for implementing embodiments of the present disclosure.

FIG. 5F is another alternative support foot 207A", 208A" for use in a configurable transit seating system 200, for implementing embodiments of the present disclosure. The alternative support foot 207A", 208A" includes a release lever 279A' that allows the foot 207A", 208A" to more easily and quickly be operated for engaging and disengaging the track. In one implementation the release lever can include a latch that can be operated by a common railroad maintenance key mounted to the seat frame 206. The key could operate the foot release via rod or cable.

Figure 6:
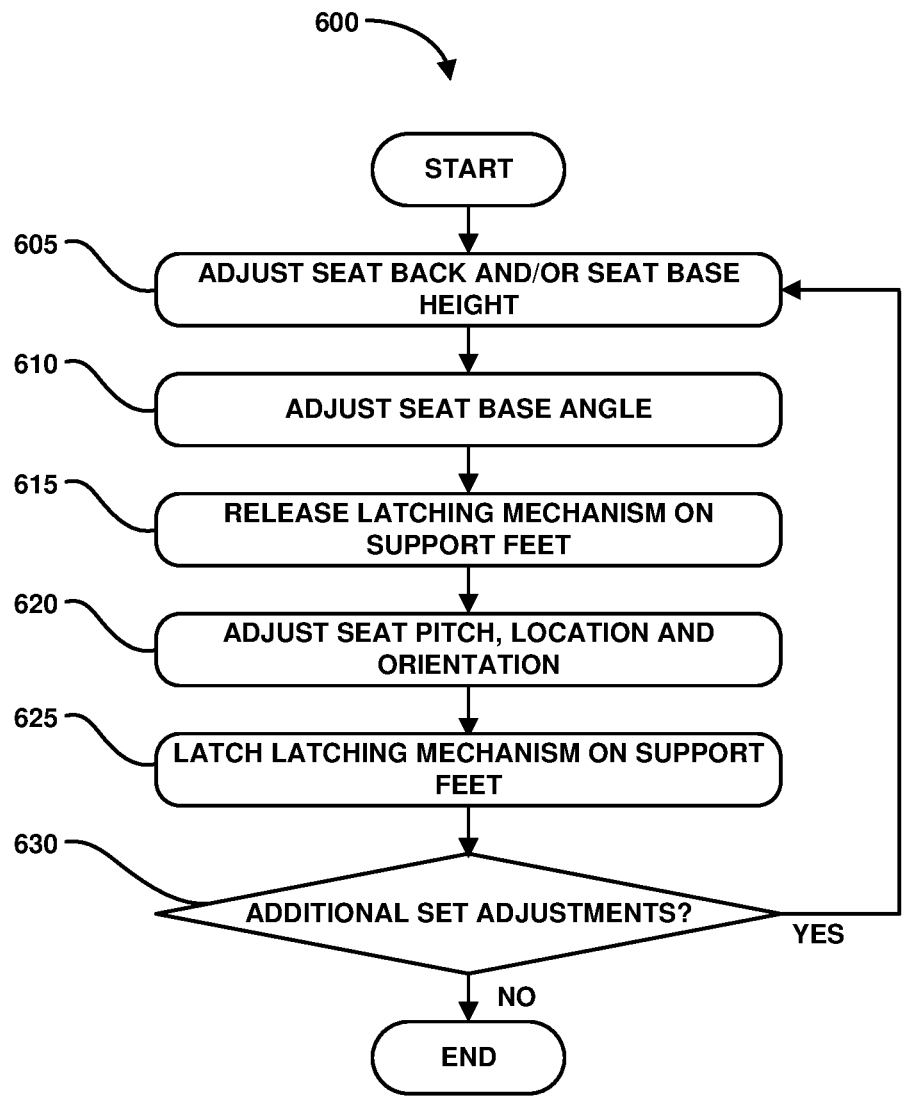
FIG. 6 is a flowchart diagram that illustrates the method operations performed in changing a configuration of the configurable transit seating system, for implementing embodiments of the present disclosure.

FIG. 6 is a flowchart diagram that illustrates the method operations 600 performed in changing a configuration of the configurable transit seating system 200, for implementing embodiments of the present disclosure. The operations illustrated herein are by way of example, as it should be understood that some operations may have sub-operations and in other instances, certain operations described herein may not be included in the illustrated operations. With this in mind, the method and operations 600 will now be described.

In an operation 605, adjust the seat back subframe 206A and/or the seat base 204 to a desired height. The control handle is activated to release the catches on the seat back height track 260, 262 system, so that the seat back subframe and/or the seat base can be adjusted to the desired height.

In an operation 610, adjust the seat base frame 204A to a desired angle. The control handle disengages the hinge latch system 252 which allows the seat base frame 204A to rotate about the pivot 253 to adjust the seat base frame to the desired angle upward or downward. It should be understood that while the illustrated implementations of the hinge latch system 252 shows three or five positions, that more than 5 and fewer than 3 positions could be included in the hinge latch system.

In an operation 615, disengage the latching mechanism 279, 279' on the support feet 207A, 208A for one or more rows 212 of seats 201 to allow the feet to disengage from and/or move along the tracks 242A, 242B. It should be understood that while the disclosed latching mechanisms 279, 279' are manually operated, individual latches, the latch mechanisms can be connected together to operate simultaneously, with a single latch control. Similarly, it should be understood that remote controlled, powered latches could be used in the latching mechanisms to ease the use of the multiple latches.

In an operation 620, adjust the pitch of the one or more rows 212 of seats 201. Adjusting the pitch can also include adjusting the direction (e.g., forward facing rows and seats or rearward facing rows and seats, and combinations thereof) the rows 212 or seats are oriented in the desired direction and location within the vehicle 220.

In an operation 625, engaging the latching mechanism on the support feet 207A, 208A for one or more rows 212 of seats 201 to secure the rows of seats to the tracks 242A, 242B in the vehicle.

In an operation 630, are all rows 212 and seats 201 in the desired height, pitch, location and orientation in the vehicle? If the all rows 212 and seats 201 are not in the desired height, pitch, location and orientation in the vehicle, then the method operations continue in operation 605 as described above. If the all rows 212 and seats 201 are in the desired height, pitch, location and orientation in the vehicle, then the method operations can end.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A seating system comprising:
 a plurality of seat frames, disposed in a first row and a second row, the first row being disposed behind the second row, each seat frame including;
 at least two forward supports;
 at least two rearward supports, the at least one forward supports and the at least two rearward supports are capable of being detachably secured to a transit vehicle floor, wherein the at least two rearward supports are separated by a rearward support width that is not equal to a forward support width separating the at least two forward supports;
 a seat back height track system vertically and slideably coupled to the seat frame;
 a seat back subframe coupled to the seat back height track system; and
 a seat base frame coupled to the seat back height track system through a seat hinge.

2. The system of claim 1, wherein the at least two forward supports overlap the at least two rearward supports when a first seat frame of the plurality of seat frames is disposed in the first row and a second seat frame of the plurality of seat frames is disposed in the second row are in a nested configuration.

3. The system of claim 2, wherein the rearward support width is less than the forward support width and wherein the at least two forward supports overlap to an outside of the at least two rearward supports when the first seat frame and the second seat frame are in the nested configuration.

4. The system of claim 2, wherein the rearward support width is greater than the forward support width and wherein the at least two forward supports overlap to an inside of the at least two rearward supports when the first seat frame and the second seat frame are in the nested configuration.

5. The system of claim 2, wherein the hinge allows the seat base frame to be angled downward when the first seat frame and the second seat frame are in the nested configuration.

6. The system of claim 2, wherein the first row and the second row have a minimum seat pitch when the first seat frame and the second seat frame are in the nested configuration.

7. The system of claim 1, wherein the at least two forward supports and the at least two rearward supports are capable of being detachably secured to the transit vehicle floor though a track system secured to the floor of the transit vehicle.

8. The system of claim 1, wherein the seat back height track system provides a height adjustment for the seat back subframe.

9. The system of claim 1, wherein the seat back height track system provides a height adjustment for the seat base frame.

10. A method of adjusting seats comprising:
pivoting a first seat base about a pivot slideably coupled to a first seat frame, the first seat frame being disposed in a first row, the first row being disposed behind a second row in a transit vehicle, the second row including a second seat frame, wherein first seat frame includes two forward supports and the second seat frame includes two rearward supports, wherein the two rearward supports are separated by a rearward support width and the two forward supports are separated by a forward support width, and
wherein the first seat frame and the second seat frame are detachably secured to a track system in a floor plane of the transit vehicle, and
wherein the first seat base is pivoted in a downward angle to a first seat base angle between perpendicular and parallel to the floor plane of the transit vehicle to increase a space between the first seat frame and the second seat frame.

11. The method of claim 10, wherein the pivot is slideably coupled to the first seat frame by a seat back height track system and wherein pivoting the first seat base about the pivot includes:
disengaging a latch on the seat back height track system;
raising the first seat base to a first raised position relative to the first seat frame; and
engaging the latch on the seat back height track system to secure the first seat base in the first raised position.

12. The method of claim 11, wherein the seat back is slideably coupled to the first seat frame by the seat back height track system and raising the first seat base to the first raised position relative to the seat frame includes raising the seat back to the first raised position.

13. The method of claim 12, further comprising reducing a pitch between the first seat frame and the second seat frame including:
disengaging a plurality of latches securing the second seat frame to the track system;
moving the second seat frame toward the first seat frame to reduce a space between a front of the first seat frame and a back of the second seat frame; and
engaging the plurality of latches to secure the second seat frame to the track system.

14. The method of claim 10, wherein the first seat base angle is substantially perpendicular to the floor plane of the transit vehicle.

15. A method of adjusting seats comprising:
pivoting a first seat base about a pivot slideably coupled to a first seat frame, the first seat frame being disposed in a first row, the first row being disposed behind a second row in a transit vehicle, the second row including a second seat frame, wherein first seat frame includes two forward supports and the second seat frame includes two rearward supports, wherein the two rearward supports are separated by a rearward support width that is not equal to a forward support width separating the two forward supports, and
wherein the two forward supports of first seat frame and two rearward supports of the second seat frame are detachably secured to a track system in a floor plane of the transit vehicle, and
wherein the first seat base is pivoted to a first seat base angle between perpendicular and parallel to the floor plane of the transit vehicle to increase a space between the first seat frame and the second seat frame; and
minimizing a pitch between the first seat frame and the second seat frame including:
disengaging a plurality of latches securing at least one of the first seat frame and the second seat frame to the track system;
moving at least one of the first seat frame and the second seat frame until a front of the first seat frame is substantially touching a back of the second seat frame and the two forward supports of the first seat frame overlap the two rearward supports of the second seat frame; and
engaging the plurality of latches to secure the first seat frame and the second seat frame to the track system.

16. A transit seating system comprising:
a first seat frame of a first seat, the first seat being disposed in a first row, the first row being disposed behind a second row in a transit vehicle, the second row including a second seat, the second seat including a second seat frame;
at least two first forward supports and at least two first rearward supports included in the first seat frame;
at least two second forward supports and at least two second rearward supports included in the second seat frame,
wherein the at least two second rearward supports are separated by an inner width that is greater than an outside width of the at least two first forward supports,
wherein the at least two second rearward supports and the at least two first rearward supports are detachably secured to corresponding outer tracks,
wherein the at least two second forward supports and the at least two first forward supports are detachably secured to corresponding inner tracks such that at least one of the first seat frame and the second seat frame can disengage from and moved along the inner and outer tracks,
wherein the inner tracks and the outer tracks being capable of being secured to a transit vehicle floor;
a seat back height track system vertically slideably coupled to the first seat frame;

a seat back subframe coupled to the first seat back height track system; and a seat base frame coupled to the seat back height track system through a seat hinge.

17. The system of claim 16, wherein the first seat base is pivoted to a first seat base angle between perpendicular and parallel to a floor plane of the transit vehicle to increase a space between the first seat and the second seat.

18. The system of claim 16, wherein the at least two first forward supports are disposed between the at least two second rearward supports when the first seat frame and the second seat frame are in a nested configuration.

* * * * *